No. 829,286. PATENTED AUG. 21, 1906.
M. W. PALMER.
BEET PULLER.
APPLICATION FILED MAR. 15, 1906.
2 SHEETS—SHEET 1.
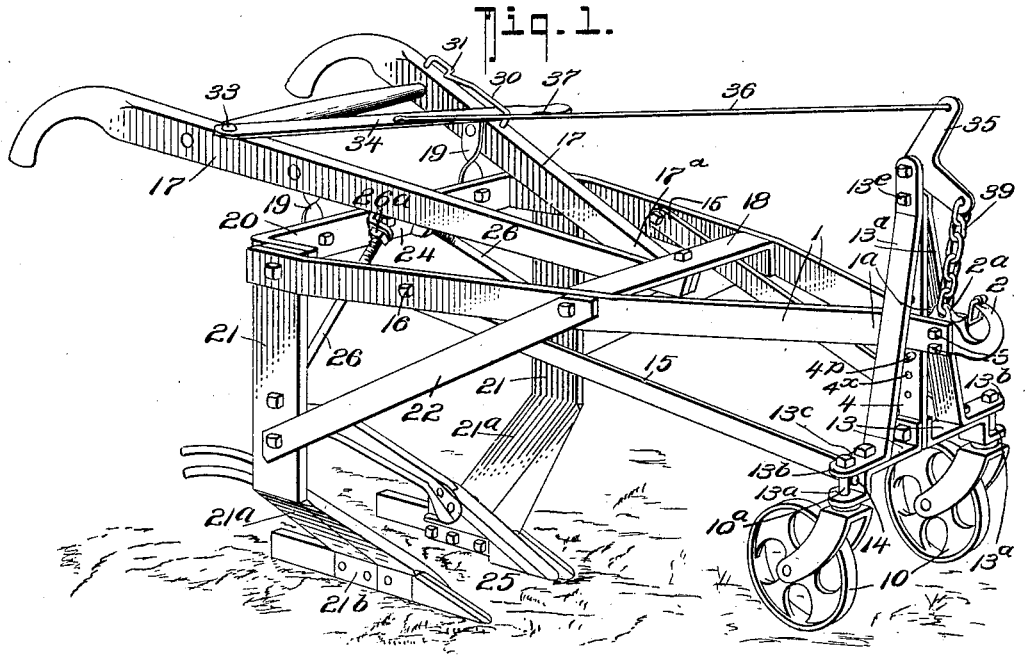
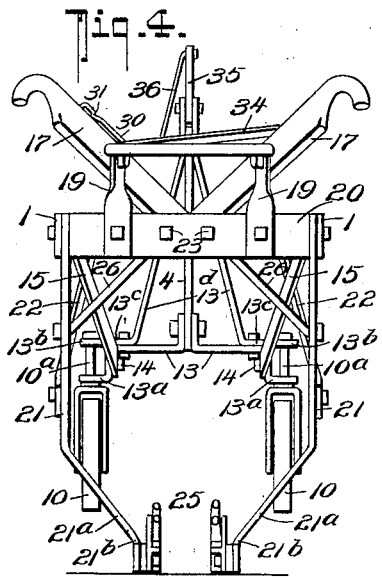
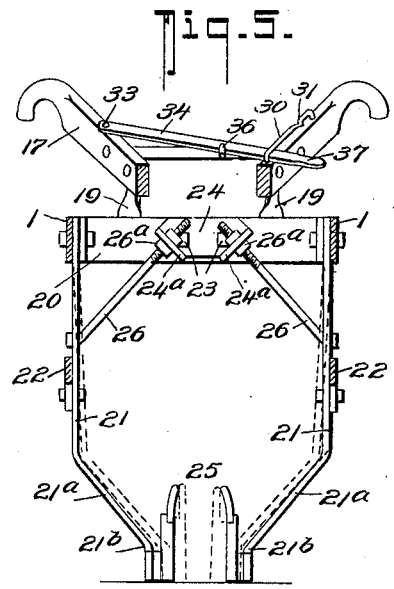
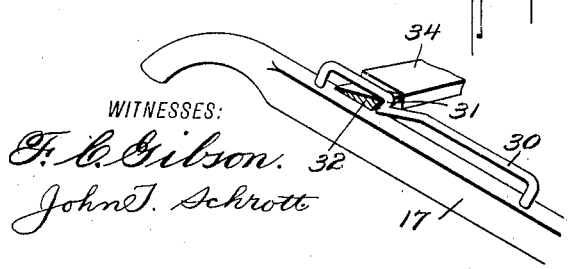
WITNESSES:
F. C. Gilson.
John T. Schrott
INVENTOR
Merritt W. Palmer.
BY
Fred G. Dieterich
ATTORNEYS

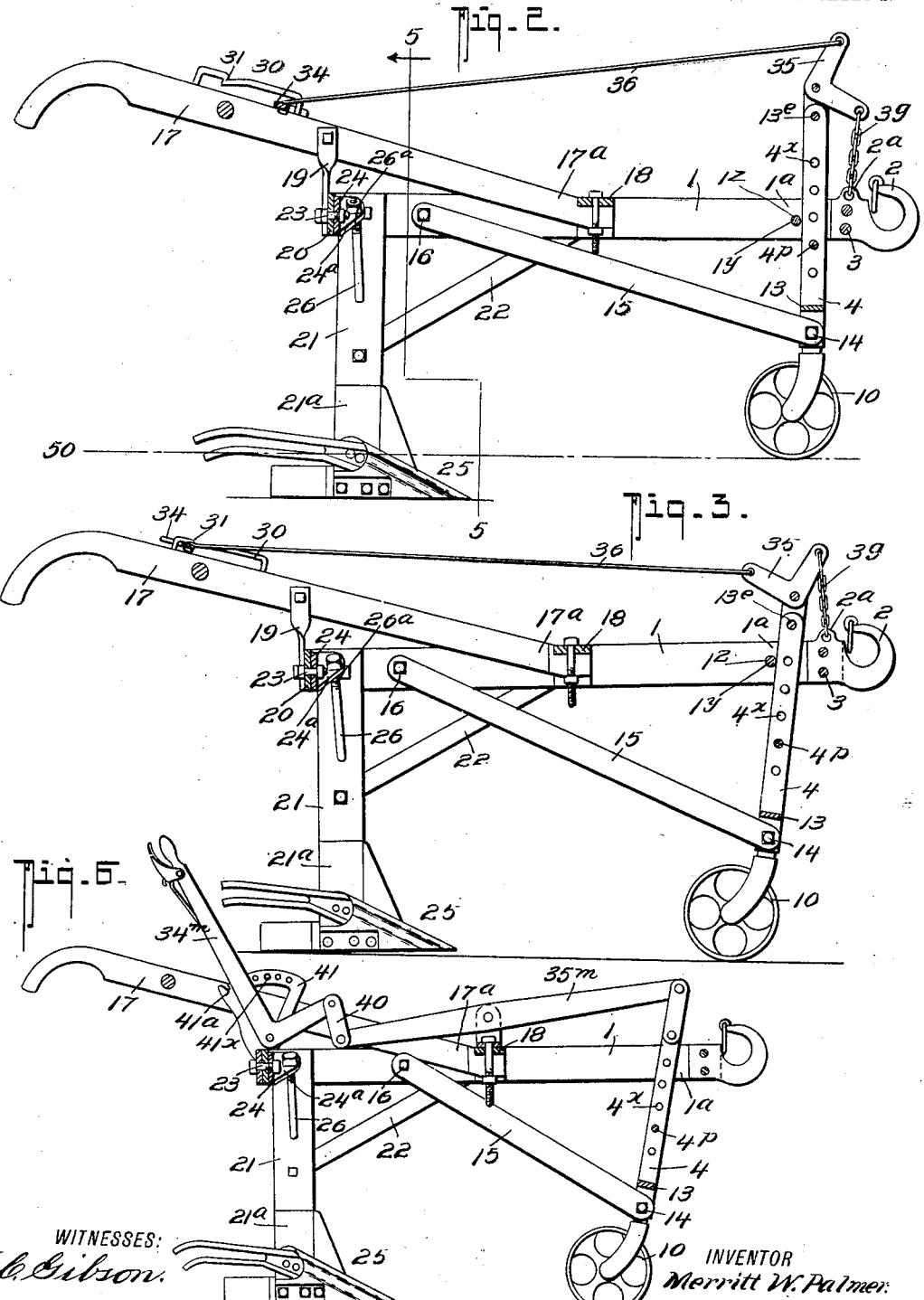

UNITED STATES PATENT OFFICE.

MERRITT WESLEY PALMER, OF HAMILTON, MICHIGAN.

BEET-PULLER.

No. 829,286.     Specification of Letters Patent.     Patented Aug. 21, 1906.

Application filed March 15, 1906. Serial No. 306,272.

*To all whom it may concern:*

Be it known that I, MERRITT WESLEY PALMER, residing at Hamilton, in the county of Allegan and State of Michigan, have invented certain new and useful Improvements in Beet-Pullers, of which the following is a specification.

My present invention which relates to that type of beet plows or pullers having runners adapted to enter the soil under and to straddle the beet and pull it bodily upward upon lifter-arms, more particularly seeks to improve a construction of beet puller or plow disclosed in my patents No. 699,561, dated May 6, 1902, and No. 772,819, dated October 18, 1904, whereby to render the operation of the machine more effective, the manufacture of the same more economical, and the coöperative arrangement of the several parts more durable and compact.

My present invention also relates to an improvement on the type of beet-puller disclosed in my copending application, Serial No. 295,120, dated January 8, 1906, part of which application just referred to has been divided out and forms a part of the subject-matter of this application.

My present invention in its more detailed nature involves an improved construction of machine in which means are provided for shifting the draft-frame with relation to the caster-wheel frame so that the puller can be readily handled and when not in use can be directly conveyed from place to place without the runners entering the ground.

My present invention also embodies gage-wheels having a swivel mounting to enable the machine being turned around without tipping or lifting the puller around.

With other objects in view than have been heretofore specified the invention also includes certain novel construction, combination, and arrangement of parts, all of which will be first described in detail and then be specifically pointed out in the appended claims, reference being had to the accompanying drawings, in which—

Figure 1 is a perspective view of my invention, showing the same ready for use and the runners just ready for entering the ground. Fig. 2 is a vertical longitudinal section of my invention showing the position when the runners are in the ground and serve to pull the beets. Fig. 3 is a view similar to Fig. 2, showing the position of the parts when the runners are out of the ground and the machine is ready to be turned or pulled along over the ground. Fig. 4 is a rear elevation of my machine. Fig. 5 is a cross-section on the line 5 5 of Fig. 2 looking in the direction of the arrow. Fig. 6 is a detail view of a slightly-modified form of my invention. Fig. 7 is a detail view showing the manner of locking the lever 34.

Referring now to the accompanying drawings, in which like numerals of reference indicate like parts in all of the figures, the horizontal or draft frame is substantially V-shaped in plan view and consists of the horizontally-set side bars 1 1, whose front ends lap, as at 1ª, and are spaced apart by the pull clevis or draft devices 2, as shown, which clevis 2 is secured in position by suitable bolts 3 and is provided with an eye 2ª to receive a connecting member 39, hereinafter again referred to. The ends 1ª 1ª of the bars 1 1 are also sufficiently spaced apart to permit passage of the vertical supporting-standard 4 of the gage-wheel frame in which the caster gage-wheels 10 10 are mounted. The support 4 is vertically held and is secured to the horizontally-projecting bracket members 13 13, which terminate in bearings 13ª to receive the swivel-shaft 10ª of the wheels 10, the wheels 10 having a swivel mounting, similar to the ordinary "caster-wheels," so that the machine can be readily manipulated, as will be hereinafter more fully explained.

The bearings 13ª coöperate with supplemental bearings 13ᵇ in the laterally-projecting ears 13ᶜ of the brace members 13ᵈ, that are secured to the bracket members 13 and project upwardly and convergingly and terminate above the top of the support 4, they being secured to the support 4 by bolts 13ᵉ, passing through the members 13ᵈ and the support 4, as shown. The upper ends of the brace members 13ᵈ are spaced apart to receive a bell-crank lever 35, to the forward end of which the connecting member 39 is attached, while a rod 36 connects the bell-crank lever 35 with the operating-lever 34, fulcrumed at 33 on the handle 17 of the machine, and the lever 34 has a hand-grasping portion 37 and passes through a guard 30, secured to the other handle 17, and is locked in its rearward position by a catch 32, carried by the lever 34, that engages a stop portion 31, as shown. Pivotally secured by bolts 14 or otherwise to the bracket 13ª are a pair of rearwardly-projecting brace-bars 15, whose other ends are pivotally secured by bolts 16 to the bars 1. The handles 17 have their front ends 17ª adjustably bolted to the cross-brace 18, that is secured to the bars 1 1, and the handles 17 are also pivotally secured to the brackets 19, which are secured to the rear brace-bar 20 of the frame at the rear of the machine.

Secured between the brace-bar 20 and the bars 1 1 are downwardly-projecting standards 21, which are inwardly bent at 21ª near their lower ends and have their extreme lower ends 21$^b$ bent, so as to be secured to the shoes 25 of any approved type, such as disclosed in my copending application hereinbefore referred to, as the said shoes, *per se*, form no part of my present invention. The standards 21 are braced by suitable brace-bars 22, that connect with the bars 1 1'.

Secured to the rear brace-bar by bolts 23 is a plate 24, which has the forwardly-projecting ears 24ª, apertured to permit passage of the adjusting-rods 26, that are secured at one end to the standards 21, and have their other ends threaded to receive the adjusting-nuts 26ª 26ª, by means of which the standards 21 can be drawn closer together and permitted to spring farther apart, as clearly shown in dot and full lines in Fig. 5, thus enabling the shoes 25 to be set at a greater or less distance apart as circumstances may make advisable.

The standard 4 has a series of pin-receiving apertures 4$^x$, through which a suitable pin 4$^p$ may be passed to form a stop for the draft-frame when the parts have been adjusted through the medium of the shifting lever 34 and the said pin 4$^p$ serves to regulate the depth to which the runners will enter the ground.

By reason of the swivel gage-wheels 10 I am enabled to move the apparatus in various directions and conveniently handle the same, and by pulling the lever 34 back to the limit of its movement and locking the same the parts will assume the position shown in Fig. 3, when the machine can be drawn over the surface of the ground without the plows 25 entering the soil. When the apparatus is in operation, the parts are in the position shown in Fig. 2, the broken line 50 representing the surface level of the ground. When the puller is in operation, the draft-frame works up and down on the gage-wheel standard when the parts are adjusted through the medium of the lever 34, and the apertures 4$^x$ in the gage-wheel standard 4 receive a pin or bolt, as before mentioned, which is inserted to regulate the depth it is desired for the plows or runners to enter the ground, the draft-frame sliding down the gage-wheel standard until it strikes the pin. When the lever 34 is in its rearward position, the plow-points will be directed upward, as shown in Fig. 3, so that they will not enter the ground, the points being higher than the heels.

In Fig. 6 I have shown a modified form of my invention in which the lever 35 is substituted by a walking-beam 35$^m$ and connects, through a link 40, with the operating-lever 34$^m$, which in this form of my invention is in the nature of a bell-crank lever and coöperates with a segmental plate 41, having a notch portion 41ª, through the medium of which and through the catch on the lever 34$^m$ the said lever 34$^m$ can be locked in its rearward position, the pin-receiving apertures 41$^x$ being provided to receive a stop-pin (not shown) by means of which the forward motion of the lever 34$^m$ can be limited.
In this form of my invention I may dispense with the supplemental brace-bars of the caster-wheel frame.

In the first form of my invention illustrated in the drawings I provide the draft-frame with apertures 1$^z$ to receive a bolt 1$^y$ to prevent the support 4 working backward out of alinement.

From the foregoing it will be seen that by the use of my apparatus the machine can be turned around without lifting the puller at all, thus saving considerable labor, and by the use of a chain 39 instead of a single link should the machine strike a stone while in operation the draft-frame can rise up without bending or breaking any of the levers or connecting-rods.

What I claim is—

1. In a beet-puller, the combination with a draft-frame and plows carried thereby, of a caster-wheel-carrying frame including a vertical support guided between adjacent portions of the draft-bars of the draft-frame, an operating-lever pivotally mounted at the rear of the machine, means coöperatively connecting the draft-frame, the caster-wheel support and the operating-lever for raising and lowering the draft-frame on the caster-wheel support, said last-named means comprising a bell-crank lever secured to the end of the caster-wheel-frame support, flexible connections between the draft-frame and one end of said bell-crank lever and connections between the other end of said bell-crank lever and the operating-lever substantially as shown and described.
2. In a machine of the class described, the combination with a draft-frame including main draft-bars, plow-carrying standards and handle members, of a caster-wheel frame connected to said draft-bars and including a vertical standard held between the adjacent portions of the forward ends of the draft-bars, said caster-wheel frame also including brace-bars connected with the supporting-standard, caster-wheels swivelly mounted on said caster-wheel frame, and means controllable from the rear of the machine for raising and lowering the draft-frame with respect to the caster-wheel frame, substantially as shown and described.

3. A beet-pulling machine, comprising a draft-frame consisting of longitudinal bars, a rear brace-bar therefor, a clevis secured between the front ends of said bars, said front ends being spaced apart, a pair of downwardly-projecting rear standards, braces between the rear standards and the first-mentioned bars, handles connected with said longitudinal bars, an operating-lever pivotally secured to said handles, means for locking said operating-lever in one position, a vertically-adjustable gage-wheel carrying-frame having a vertical standard held between the front ends of the first-mentioned bars, connections between said last-named vertical standard, and said operating-lever and said draft-frame for adjusting the draft-frame up or down, gage-wheels mounted on said gage-wheel-carrying frame, brace-bars connecting said gage-wheel frame with said draft-frame, and plows on said rear standards, substantially as shown and described.

4. A beet-pulling machine, comprising a draft-frame consisting of longitudinal bars, a rear brace-bar therefor, a clevis secured between the front ends of said bars, said front ends being spaced apart, a pair of downwardly-projecting rear standards, braces between the rear standards and the first-mentioned bars, handles connected with said longitudinal bars, an operating-lever pivotally secured to said handles, means for locking said operating-lever in one position, a vertically-adjustable gage-wheel-carrying frame having a vertical standard held between the front ends of the first-mentioned bars, connections between said last-named vertical standard, and said operating-lever and said draft-frame for adjusting the draft-frame up or down, gage-wheels mounted on said gage-wheel-carrying frame, brace-bars connecting said gage-wheel frame with said draft-frame, plows on said rear standards, and brace-bars on said caster-wheel-carrying frame for reinforcing said vertical standard, substantially as shown and described.

5. A beet-pulling machine, comprising a draft-frame consisting of longitudinal bars, a rear brace-bar therefor, a clevis secured between the front ends of said bars, said front ends being spaced apart, a pair of downwardly-projecting rear standards, braces between the rear standards and the first-mentioned bars, handles connected with said longitudinal bars, an operating-lever pivotally secured to said handles, means for locking said operating-lever in one position, a vertically-adjustable gage-wheel-carrying frame having a vertical standard held between the front ends of the first mentioned-bars, brace-bars for said standard, a bell-crank lever pivotally secured between said brace-bars of the vertical standard, flexible connections between the clevis and one end of said bell-crank lever, and connections between the other end of said bell-crank lever and said operating-lever, substantially as shown and described.

MERRITT WESLEY PALMER.

Witnesses:
FRANK DALTON,
L. J. KLINKERS.